(12) United States Patent
Mealey et al.

(10) Patent No.: US 9,798,582 B2
(45) Date of Patent: Oct. 24, 2017

(54) LOW LATENCY SCHEDULING ON SIMULTANEOUS MULTI-THREADING CORES

(71) Applicant: INTERNATIONAL BUSINESS MACHINES CORPORATION, Armonk, NY (US)

(72) Inventors: Bruce Mealey, Austin, TX (US); Suresh E. Warrier, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/920,061

(22) Filed: Oct. 22, 2015

(65) Prior Publication Data

US 2017/0116030 A1  Apr. 27, 2017

(51) Int. Cl.
*G06F 9/48* (2006.01)
*G06F 9/455* (2006.01)
*G06F 9/50* (2006.01)

(52) U.S. Cl.
CPC ........ *G06F 9/4881* (2013.01); *G06F 9/45558* (2013.01); *G06F 9/5038* (2013.01); *G06F 9/5044* (2013.01); *G06F 2009/4557* (2013.01)

(58) Field of Classification Search
None
See application file for complete search history.

(56) References Cited

U.S. PATENT DOCUMENTS

| | | | | |
|---|---|---|---|---|
| 5,504,898 A * | 4/1996 | Klein | ..................... | G06F 9/4843 718/101 |
| 7,237,242 B2 | 6/2007 | Blythe et al. | | |
| 8,904,403 B2 | 12/2014 | Prathiba et al. | | |
| 2004/0139434 A1 * | 7/2004 | Blythe | ..................... | G06F 9/505 718/100 |
| 2008/0022284 A1 * | 1/2008 | Cherkasova | .......... | G06F 9/4881 718/104 |
| 2009/0328046 A1 * | 12/2009 | Proctor | ................. | G06F 9/4881 718/102 |
| 2011/0296148 A1 * | 12/2011 | Cain, III | ............. | G06F 9/30087 712/228 |
| 2011/0317712 A1 * | 12/2011 | Mejdrich | ............ | H04L 49/9047 370/412 |
| 2013/0024871 A1 * | 1/2013 | Gao | ....................... | G06F 9/5083 718/105 |

(Continued)

FOREIGN PATENT DOCUMENTS

WO  2007033203 A2  3/2007
WO  2015024433 A1  2/2015

*Primary Examiner* — Umut Onat
(74) *Attorney, Agent, or Firm* — Tutunjian & Bitetto, P.C.; Joseph Petrokaitis

(57) ABSTRACT

A computer program product is provided for prioritized hardware thread scheduling. The computer program product includes a non-transitory computer readable storage medium having program instructions embodied therewith. The program instructions are executable by a computer to cause the computer to perform a method. The method includes, responsive to identifying a latency sensitive workload, enabling, by an operating system, one or more hardware threads to meet dispatch latency demands for the latency sensitive workload. The method further includes responsive to detecting an absence of the latency sensitive workload, de-committing, by the operating system, the one or more hardware threads.

9 Claims, 3 Drawing Sheets

(56) References Cited

U.S. PATENT DOCUMENTS

| | | | |
|---|---|---|---|
| 2013/0024875 A1* | 1/2013 | Wang | G06F 13/22 |
| | | | 719/318 |
| 2013/0346531 A1* | 12/2013 | Hummel | G06F 13/4022 |
| | | | 709/212 |
| 2015/0169367 A1* | 6/2015 | Falco | G06F 9/4881 |
| | | | 718/101 |
| 2015/0234640 A1* | 8/2015 | Tian | G06F 13/24 |
| | | | 710/267 |
| 2015/0355936 A1* | 12/2015 | Zheng | G06F 9/4881 |
| | | | 718/108 |

\* cited by examiner

LOW LATENCY SCHEDULING ON SIMULTANEOUS MULTI-THREADING CORES

BACKGROUND

Technical Field

The present invention relates generally to data processing and, in particular, to low latency scheduling on simultaneous multi-threading cores.

Description of the Related Art

Several critical processing jobs require low latency scheduling, namely that they need to be dispatched as soon as they become runnable (for instance, when they wake up from a sleep or are interrupted on input/output (I/O) completion). Examples are heartbeat daemon threads, real-time streaming, and threads that manage devices with small data buffers. If such threads do not get dispatched fast enough, the consequences can range from a system outage or node down to loss of data.

The general mechanism to support low latency scheduling is to increase the Unix priority of a thread so that the thread gets dispatched preferentially over other threads in the system, to put the thread on a global run queue serviced by multiple central processing units (CPUs), and so forth. Also, the thread usually pins all its text and memory to avoid page faulting. Despite the preceding, there are several issues that can and often are encountered in low latency scheduling.

One such issue is that if there are no available CPUs, it can take up to 10 milliseconds until the next time slice interval for a CPU to notice the new high-priority runnable job.

Another such issue arises when an inter-processor interrupt (IPI) is sent to one or more CPUs (sending an IPI to all CPUs each time a low latency thread becomes runnable can be expensive and potentially cause scaling problems). However, the CPU(s) may still take time to respond because it (they) could be busy stuck in some disabled critical section or under an interrupt storm and may not be immediately available for dispatching the low latency thread.

Yet another such issue which can arise, and is even worse than the preceding issues, is when the low latency thread is picked by a CPU for dispatching, but the CPU may then receive an interrupt and take a while to resume the thread. Disabling interrupts on the current CPU each time the CPU wakes up is expensive (it will take longer to execute its real work) plus the thread may still get interrupted before it makes the call.

Still another such issue is that it is not clear how to manage or choose between multiple low latency threads when they become runnable at the same time.

Thus, there is a need for improved low latency scheduling on simultaneous multi-threading (SMT) cores.

SUMMARY

According to an aspect of the present principles, a computer program product is provided for prioritized hardware thread scheduling. The computer program product includes a non-transitory computer readable storage medium having program instructions embodied therewith. The program instructions executable by a computer to cause the computer to perform a method. The method includes, responsive to identifying a latency sensitive workload, enabling, by an operating system, one or more hardware threads to meet dispatch latency demands for the latency sensitive workload. The method further includes, responsive to detecting an absence of the latency sensitive workload, de-committing, by the operating system, the one or more hardware threads.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to low latency scheduling on simultaneous multi-threading cores.

In an embodiment, the present principles involve an operating system (OS) dynamically enabling a low latency pool of dedicated hardware threads (for example, one or more threads of an 8-thread P8 core as required) for low latency scheduling.

In an embodiment, the one or more hardware threads, once so dynamically enabled, are always available to dispatch/run low latency jobs (they do not dispatch any other work) and the one or more hardware threads disable all interrupts to avoid having to run interrupt handlers. They stay enabled as long as there is a need for running low latency threads. While one or more threads can be dedicated if needed for this purpose to manage multiple low latency threads, often having just one such dedicated hardware thread is sufficient.

The present principles advantageously resolve all the aforementioned issues encountered by the prior art as described above. It is noted that enabling one SMT8 thread on multi-core systems to run low-latency jobs should rarely, if ever, be a resource issue. Also, since the load of low latency jobs is quite low (the enabled hardware thread is usually idle), the low latency threads do not impact software jobs running on the other threads of the core.

It is to be appreciated that an important aspect of SMT (or hardware multithreading) is, in general, to improve application throughput by increasing the concurrency of an application. That is, with hardware multithreading, more application threads can be dispatched concurrently on a single core. Thus, in higher SMT modes (more hardware threads per core), the throughput generally improves to a limit (depending upon how much of the workload can run concurrently). This also generally improves the overall core resource utilization. Most operating systems will dynamically raise SMT modes as the number of runnable software tasks becomes larger than the number of cores. However, in accordance with the present principles, latency is improved (reduced) for an application by artificially increasing SMT mode, that is, increasing the number of active hardware threads per core, which in some cases may reduce application throughput.

Figure 1:
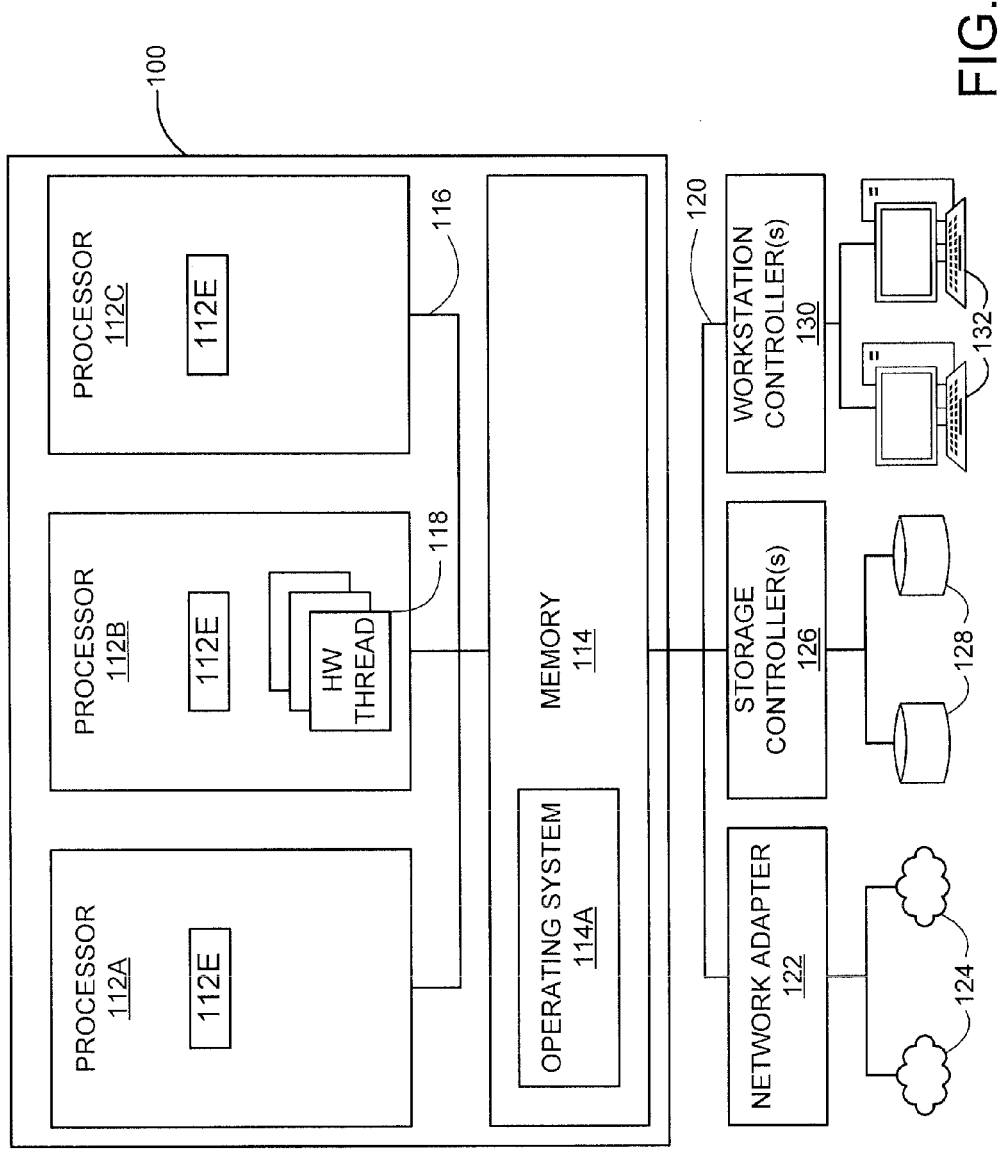
FIG. 1 shows an exemplary simultaneous multi-threading (SMT) computer 100 to which the present principles may be applied, in accordance with an embodiment of the present principles.

FIG. 1 shows an exemplary simultaneous multi-threading (SMT) computer 100 to which the present principles may be applied, in accordance with an embodiment of the present principles.

In an SMT processor, multiple hardware threads are defined in the processor, with each thread capable of executing a particular task assigned to that thread.

Computer 100 generically represents, for example, any of a number of multi-user computers such as a network server, a midrange computer, a mainframe computer, etc., e.g., an IBM eServer computer. However, it should be appreciated that the invention may be implemented in other computers and data processing systems, e.g., in single-user computers such as workstations, desktop computers, portable computers, and the like, or in other programmable electronic devices (e.g., incorporating embedded controllers and the like). In addition, the invention may also be utilized in connection with non-logically partitioned multithreaded computers.

Computer 100 generally includes one or more processors collectively denoted by the reference numeral 112 (and, in this example, including processors 112A, 112B, and 112C) coupled to a memory 114 via a bus 116. At least one of the processors 112 may be implemented as simultaneous multi-threading (SMT) processors. At least one of the processors 112 may have one or more SMT cores for implementing simultaneous multi-threading. As such, processor 112B is shown incorporating a plurality of hardware (HW) threads 118. For the most part, each hardware thread 118 in a multithreaded processor 112B is treated like an independent processor by the software resident in the computer. In this regard, for the purposes of present principles, a single threaded processor will be considered to incorporate a single hardware thread, i.e., a single independent unit of execution. It will be appreciated, however, that software based multi-threading or multitasking may be used in connection with both single threaded and multithreaded processors to further support the parallel performance of multiple tasks in the computer. The processors can include a cache 112E implementing one or more local queues.

In addition, as is also illustrated in FIG. 1, one or more of processors 112 (e.g., processor 112C) may be implemented as a service processor, which is used to run specialized firmware code to manage system initial program loads (IPL's), and to monitor, diagnose and configure system hardware. Generally, computer 100 will include one service processor and multiple system processors, which are used to execute the operating systems and applications resident in the computer, although the invention is not limited to this particular implementation. In some implementations, a service processor may be coupled to the various other hardware components in the computer in manner other than through bus 116.

Memory 114 may include one or more levels of memory devices, e.g., a DRAM-based main storage, as well as one or more levels of data, instruction and/or combination caches, with certain caches either serving individual processors or multiple processors as is well known in the art. Furthermore, memory 114 is coupled to a number of types of external devices via a bus 120, e.g., one or more network adapters 122 (for interfacing the computer with network(s) 124), one or more storage controllers 126 (for interfacing the computer with one or more storage devices 128) and one or more workstation controllers 130 (for interfacing with one or more terminals or workstations 132 via a plurality of workstation adapters). Memory 114 includes an operating system 114A for performing at least some of the features of the present principles, as described in further detail herein. Operating system 114A operates under the control of the processors 112.

Those skilled in the art will recognize that the exemplary environment illustrated in FIG. 1 is not intended to limit the present principles. Indeed, those skilled in the art will recognize that other alternative hardware and/or software environments may be used without departing from the scope of the present principles.

Figure 2:
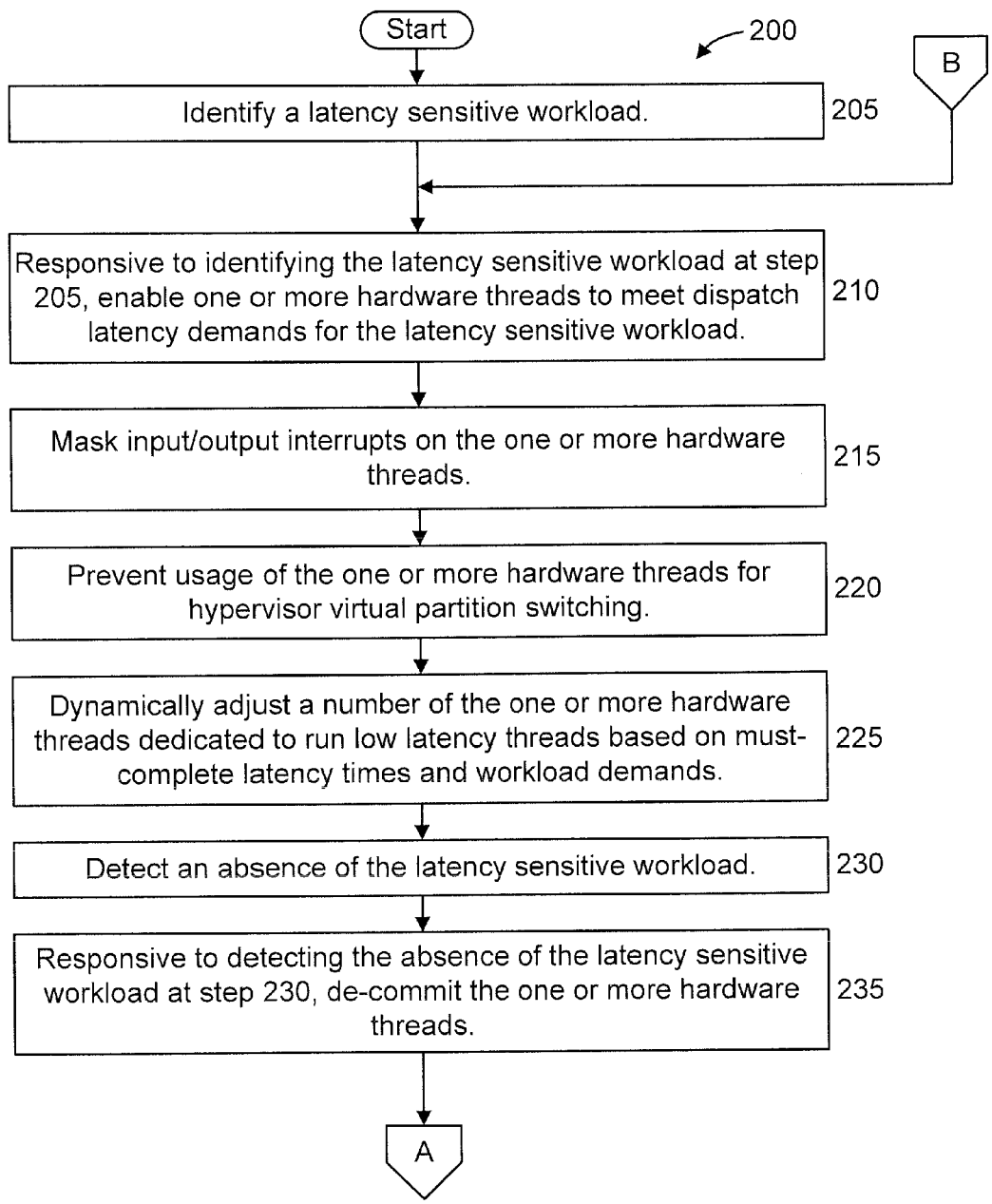
FIGS. 2-3 show an exemplary method 200 for low-latency scheduling on simultaneous multi-threading (SMT) cores, in accordance with an embodiment of the present principles.
Figure 3:
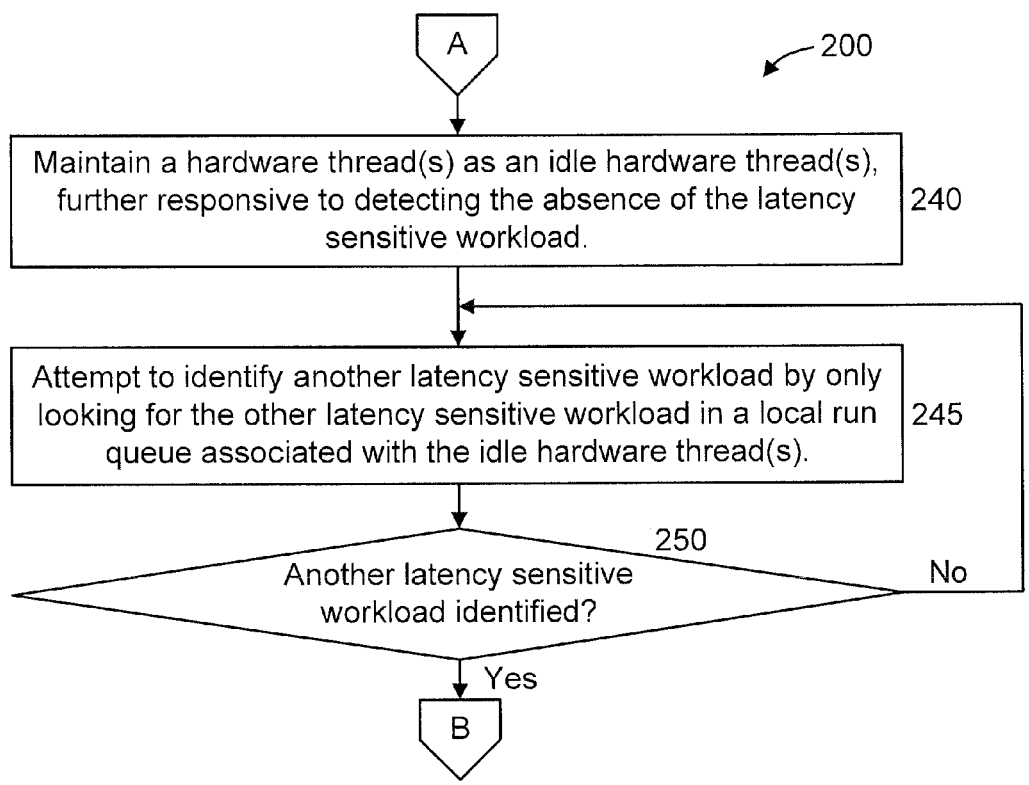

FIGS. 2-3 show an exemplary method 200 for low latency scheduling on simultaneous multi-threading (SMT) cores, in accordance with an embodiment of the present principles. In an embodiment, the steps of method 200 are performed by an operating system under the control of one or more processors. In other embodiments, one or more other elements can also be involved to perform one or more of the steps of method 200, while maintaining the spirit of the present principles.

At step 205, identify a latency sensitive workload. In an embodiment, the latency sensitive workload can be identified responsive to a request for low-latency scheduling. In an embodiment, the latency sensitive workload can be identified (deduced) autonomously. Of course, other ways can be used to identify a latency sensitive workload, while maintaining the spirit of the present principles.

At step 210, responsive to identifying the latency sensitive workload at step 205, enable one or more hardware threads to meet dispatch latency demands for the latency sensitive workload. In an embodiment, the one or more hardware threads are simultaneous multi-threading (SMT) threads. It is to be appreciated that step 210 involves artificially raising SMT mode.

At step 215, mask input/output interrupts on the one or more hardware threads.

At step 220, prevent usage of the one or more hardware threads for hypervisor virtual partition switching.

At step 225, dynamically adjust a number of the one or more hardware threads dedicated to run low latency threads based on must-complete latency times and workload demands.

At step 230, detect an absence of the latency sensitive workload.

At step 235, responsive to detecting the absence of the latency sensitive workload at step 230, de-commit the one or more hardware threads.

At step 240, maintain a hardware thread(s) as an idle hardware thread(s), further responsive to detecting the absence of the latency sensitive workload.

At step 245, attempt to identify another latency sensitive workload by only looking for the other latency sensitive workload in a local run queue associated with the idle hardware thread(s).

At step 250, determine if another latency sensitive workload has been identified. If so, then the method returns to step 210. Otherwise, the method returns to step 245.

A further description will now be given of various aspect of the present principles, in accordance with one or more embodiments of the present principles.

If any application requests low latency scheduling (in some cases, such application requests for low latency scheduling or the need (without the request having to be issued) for low latency scheduling could be autonomously deduced), the operating system (OS) starts by dedicating a single hardware thread to dispatching the low latency thread. The OS may decide to limit the number of dedicated hardware threads to one, even when there are multiple low latency threads. Low latency threads usually run for short bursts and then are blocked or sleep for a while (for example, a heartbeat daemon thread wakes up once a second, runs a couple of milliseconds and then goes back to sleep). Thus, it is quite possible to manage multiple heartbeat software threads with a single hardware thread. By carefully monitoring their run time requirements and characteristics, if it is determined that more than one low latency thread can become runnable at the same time and one (or more of them) of can consume a CPU long enough to impact the low latency requirements of the other threads, the OS will need to enable additional hardware threads for this purpose.

In an embodiment, the need for low latency scheduling could be autonomously deduced by, for example, based on operational characteristics and other parameters of various workloads. Of course, other techniques for autonomously deducing the need for low latency scheduling can also be used in accordance with the teachings of the present principles, while maintaining the spirit of the present principles.

The enabled hardware threads are dedicated to only run low latency threads. The enabled hardware threads block interrupts (disable all interrupts) and when the enabled hardware threads have no runnable work, they dispatch the idle thread which only looks for work in its local run queue. Only low latency jobs are ever placed on the local run queues of these enabled hardware threads. To avoid delays because of hypervisor dispatch latencies, the OS will avoid folding the core that includes these threads (this is a virtual processor management feature that gives up the core to the hypervisor for dispatching on another partition). More aggressive versions can also avoid "ceding" the hardware thread to the hypervisor, although doing so could now impact other software threads running on the "primary thread" of the core since the core is now running in SMT2 mode (that is, 2 threads per core) instead of the more efficient ST (single threaded) mode.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as JAVA, SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer program product for prioritized hardware thread scheduling, the computer program product comprising a non-transitory computer readable storage medium having program instructions embodied therewith, the program instructions executable by a computer to cause the computer to perform a method comprising:
    responsive to identifying a latency sensitive workload, activating, by an operating system, one or more hardware threads from an idle state to meet dispatch latency demands for the latency sensitive workload;
    avoiding delays due to hypervisor dispatch latencies by preventing the one or more activated hardware threads from performing hypervisor virtual partition switching; and
    responsive to completing the latency sensitive workload, deactivating the one or more activated hardware threads and returning them to the idle state,
    wherein the one or more hardware threads in the idle state seek other latency sensitive workloads in a local run queue associated with the one or more hardware threads in the idle state.

2. The computer program product of claim 1, wherein the one or more hardware threads are simultaneous multi-threading threads.

3. The computer program product of claim 1, further comprising dynamically adjusting, by the operating system, a number of the one or more hardware threads dedicated to run low latency threads based on must-complete latency times and workload demands.

4. The computer program product of claim 3, further comprising masking input/output interrupts on the one or more activated hardware threads before preventing the one or more activated hardware threads from performing the hypervisor virtual partition switching.

5. The computer program product of claim 4, further comprising disabling, by the operating system, input/output interrupts on the one or more hardware threads.

6. The computer program product of claim 1, further comprising processing, by a processor core, at least a portion of the latency sensitive workload using the one or more hardware threads.

7. The computer program product of claim 6, wherein the processor core is a simultaneous multi-threading processing core.

8. The computer program product of claim 1, wherein, when the one or more hardware threads in the idle state are activated, the one or more hardware threads increase a number of active threads per processor core.

9. The computer program product of claim 1, wherein the latency sensitive workload is identified responsive to a request for low-latency scheduling for the latency sensitive workload.

* * * * *